United States Patent [19]

Warszawski et al.

[11] Patent Number: 4,604,332
[45] Date of Patent: Aug. 5, 1986

[54] FUEL CELL STRUCTURES

[75] Inventors: Bernard Warszawski, Paris; Pierre Fauvel, Limours; Sylvain Dupré, Chilly Mazarin, all of France

[73] Assignee: Occidental Chemical Corporation, N.Y.

[21] Appl. No.: 733,029

[22] Filed: May 13, 1985

[30] Foreign Application Priority Data

May 11, 1984 [FR] France ................ 84 07313

[51] Int. Cl.⁴ ............................................. H01M 8/24
[52] U.S. Cl. ........................................ 429/38; 429/39
[58] Field of Search ................ 429/18, 35, 36, 37, 429/38, 39

[56] References Cited

U.S. PATENT DOCUMENTS

| 3,395,047 | 7/1968 | Terry et al. | 136/86 |
| 3,489,614 | 1/1970 | Tomter | 429/38 |
| 3,530,005 | 9/1970 | Leonard | 429/38 |
| 3,666,561 | 5/1972 | Chiku | 429/18 |
| 3,690,954 | 9/1972 | Warszawski et al. | 429/39 |
| 3,814,631 | 6/1974 | Warszawski et al. | 429/39 |
| 3,833,424 | 9/1974 | Louis et al. | 429/38 |
| 4,124,478 | 11/1978 | Tsien et al. | 429/39 |
| 4,210,512 | 7/1980 | Lawrance et al. | 429/38 |
| 4,214,969 | 7/1980 | Lawrance | 429/38 |

FOREIGN PATENT DOCUMENTS

1174731 12/1969 United Kingdom .

Primary Examiner—Donald L. Walton
Attorney, Agent, or Firm—Sughrue, Mion, Zinn Macpeak & Seas

[57] ABSTRACT

The fuel cell structure is constituted by a plurality of cells disposed in electrical contact with one another, each cell comprising two porous electrodes, an electrolyte filling the gap between the said electrodes, and two impermeable bipolar current collectors. The bottom and top portions of the collectors (23) are provided on both faces thereof with grooves or hollows enabling the anode face of the collectors to be supplied with fuel and the cathode face to be supplied with oxidant. Elongate ribs (39, 37, 38) constitute distribution channels (35, 36) for the gas flows, the said channels supplying channels which run over the central conductive zones (24) of the collectors substantially vertically.

6 Claims, 13 Drawing Figures

FUEL CELL STRUCTURES

FIELD OF THE INVENTION

The invention relates to improvements in fuel cell structures constituted by a plurality of cells disposed in electrical contact with one another, each cell comprising:

first and second porous electrodes which are preferably plane in shape with parallel faces, one being a cathode and the other an anode, and each including a specific catalyst;

an electrolyte filling the gap situated between the said electrodes; and two impermeable bipolar current collectors, including at least a central conductive zone having channels on each face of the said collectors, a first collector coming into electrical contact via the high points of its cathode face with the external surface of the said cathode, and via its anode face with the external surface of the anode of an adjacent cell, and a second collector coming into electrical contact via the high points of its anode face with the external surface of the said anode, and via its cathode face with the cathode of the other adjacent cell, an oxidizing gas flowing between the said cathode and the cathode face of the first collector, and a fuel gas flowing between the said anode and the anode face of the second collector, the said first and second electrodes being applied on either side of a frame preferably made of insulating plastic material and having a central orifice in the form of a quadrilateral, whereby said electrodes and said frame together define an electrolyte compartment with the top and bottom portions of the said collectors situated on either side of the central conductive zone being provided with orifices for conveying fuel and electrolyte through the cell structure, one face of the said top and bottom portions of the said collectors being provided with grooves or hollows enabling both the anode face of the collector to be supplied with fuel from the fuel conveying orifices disposed in one of said portions, and the fuel to be evacuated via the fuel-conveying orifices disposed in the other portion, the other face of the said portions being provided with hollows communicating with the exterior enabling the cathode face of the collector to be supplied with oxidant, means for distributing the gas flows being disposed in the said grooves and hollows provided in both faces of the top and bottom portions of the collector.

The aim of the present invention is to define dispositions which improve the uniformity of the gas flows.

SUMMARY OF THE INVENTION

In a fuel cell structure of the above-defined type and in accordance with the present invention, the said distribution means are formed by elongate ribs which form distribution channels, the top face of the ribs lying in the same plane as the face of the portion on which said ribs are provided, the collectors including parallel splines in their central conductive zones defining channels having an average vertical orientation for conveying the gas flows and which are fed from the said distributing channels.

In a particular embodiment of the invention, the fuel supply orifices are preferably oblong in shape with the fuel-conveying grooves or hollows in the curent collectors opening out close to the portions of said oblong orifices which are situated closest to the central conductive zone of the collector, the fluid-distributing ribs defining a network that flares away from the said orifices towards the central conductive zone of the collector, ribs situated adjacent to the oblong shaped orifices defining channels which may themselves supply a greater number of intermediate channels defined by other ribs of greater length and leading to the vicinity of the channels of the collector, each intermediate channel supplying at least one channel of the central conductive zone of the collector.

According to a preferred feature of the invention, the elongate ribs disposed on the faces of the bottom and top portions of the collector in contact with the oxidant supplied to the cathode face of the collector define distribution channels which fan out in their portions adjacent to the central conductive zone of the collector.

In one embodiment, the porous electrodes are pressed against frames made of insulating plastic material and having respective central orifices which are quadrilateral in shape, the bottom and top portions of the frames facing the hollows provided in the bottom and top portions of the collector having the means for enabling the cathode face of the collector to be supplied with oxidant being provided, in the vicinity of the exterior edge of the said frames, with corresponding notches increasing the oxidant inlet and outlet sections to the cell.

BRIEF DESCRIPTION OF THE DRAWINGS

Embodiments of the invention are described by way of example with refernece to the accompanying drawings, in which.

MORE DETAILED DESCRIPTION

In the figures, references 1 and 2 designate the porous electrodes used in the construction of a fuel cell structure in accordance with the invention.

In the embodiment described and shown the anode is designated by reference numeral 1 and has one face in contact with the electrolyte and its other face in contact with a fuel gas, while the cathode is designated by the reference numeral 2 and has one face in contact with the electrolyte and its other face in contact with an oxidizing gas.

These electrodes may be made of carbon or graphite together with a plastic material such as polytetrafluoroethylene for example, and each electrode includes a specific catalyst.

By way of example only, the electrodes may be of flexible structure as described in French patent No. 79 25 879 of Oct. 18, 1979 (equivalent to U.S. Pat. No. 4,317,867). They may be made, in particular, by the methods described in French patent numbers 79 25 877 and 79 25 878 likewise filed Oct. 18, 1979 (equivalent to U.S. Pat. No. 4,317,789 and to Canadian patent No. 1 139 833 respectively).

Figure 1:
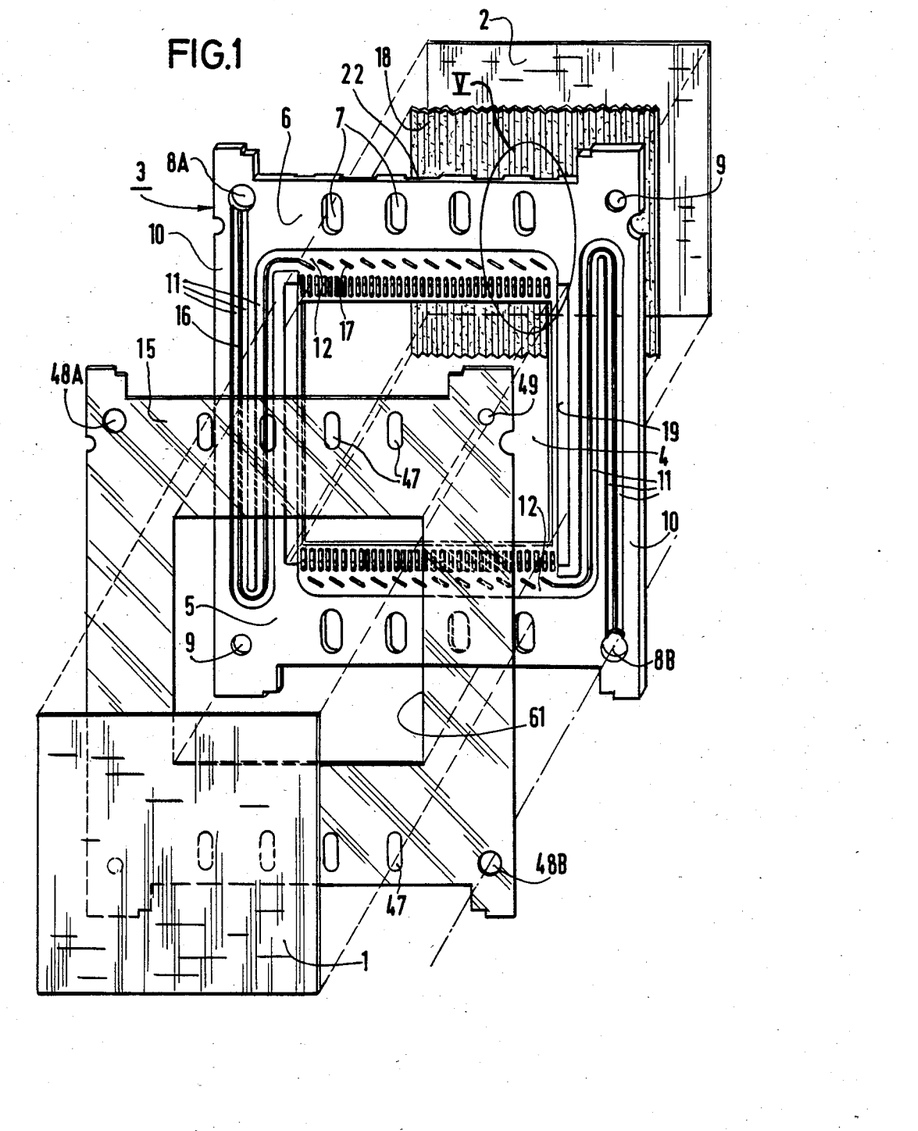
FIG. 1 is an exploded view of several of the components of a cell in a fuel cell structure in accordance with the invention.

These two electrodes are pressed against opposite faces of a frame 3 having a central orifice 4 in the form of a quadrilateral, such that the electrodes and the frame define an electrolyte compartment.

The frame 3 is advantageously made of an insulating plastic material such as polypropylene, polyvinyl chloride (PVC), acrylonitrile butadiene styrene (ABS), polyethylene, polystyrene, polysulphones, . . . .

It may be about 0.2 mm to 5 mm thick and is preferably 0.5 mm to 1.5 mm thick.

In the example shown, the central orifice 4 is square.

The bottom and top portions 5 and 6 respectively of the frame 3 are provided with orifices for conveying fuel and electrolyte through the fuel cell structure.

Reference 7 designates orifices for fuel flow, and in the example shown they are oblong.

Orifice 8A serves to convey electrolyte through the fuel cell structure and as an inlet for conveying electrolyte into the electrolyte compartment.

Orifice 8B serves to convey electrolyte through the fuel cell structure and as an outlet for evacuating electrolyte from from the electrolyte compartment.

Reference 9 designates orifices for use in centering the components during assembly and/or for passing clamping bars.

Means are provided on the face 10 of the frame 3 for conveying electrolyte from the inlet orifice 8A to the electrolyte compartment, and from the electrolyte compartment to the outlet orifice 8B.

Figure 5:
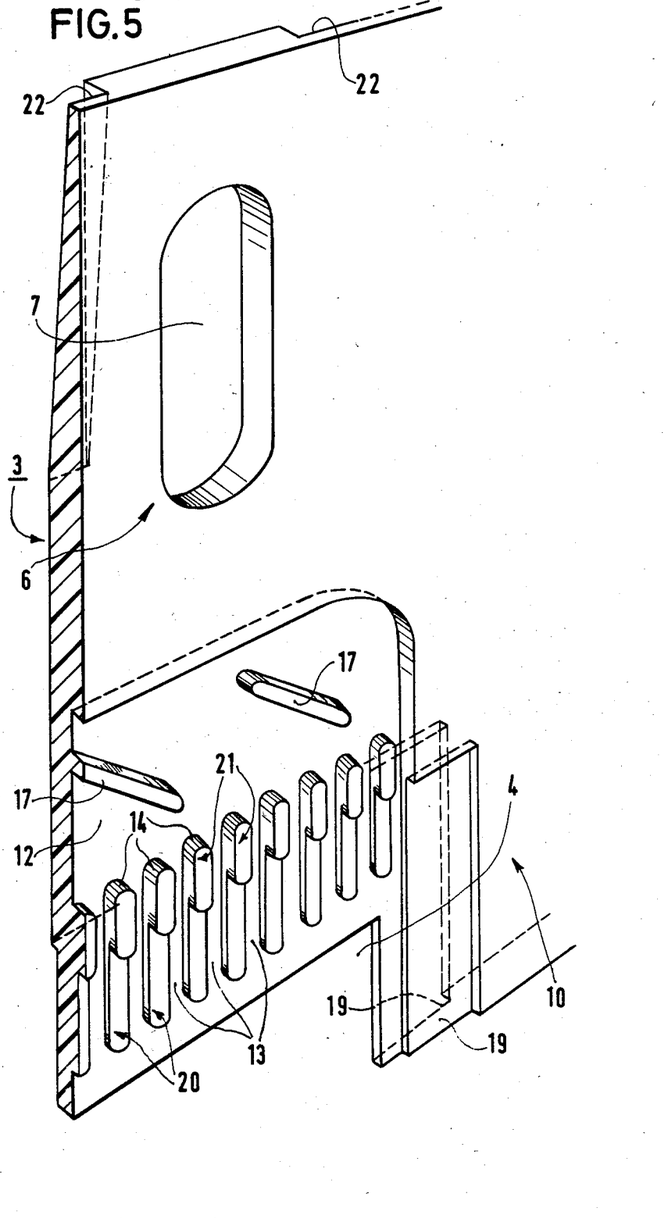
FIG. 5 is a perspective view to a larger scale of a portion or detail V in FIG. 1.

These means comprise grooves 11 leading to hollowed out portions 12 constituting electrolyte distributing and collecting manifolds disposed at the bottom and top portions 5 and 6 of the frame 3 along two opposite sides of the central orifice and communicating with the electrolyte compartment by means of a plurality of parallel microchannels 13 delimited by ribs 14 as can be seen in FIG. 5.

The tops of the ribs 14 are in the same plane as the face 10 of the frame 3.

Preferably the grooves 11 follow an elongate path and are of small section. It is important to lengthen the path and to reduce the section of the electrolyte between the electrolyte compartment and the inlet and outlet orifices in cell structures in which the electrolyte is distributed to the cells in parallel in order to raise the shunt resistance between cells and to reduce energy losses as much as possible. Further, conveying the electrolyte via small section channels of considerable length ensures a high and well-defined head loss in comparison to the head loss through the electrolyte compartments, thereby ensuring uniform distribution and flow of the electrolyte through the different cells of the structure.

In the example shown, the grooves 11 follow a U-shaped path with the bottom of the U being situated on the opposite side of the electrolyte compartment delimiting central compartment 4 relative to the corresponding orifice 8A or 8B.

This U-shape doubles the path length without significantly increasing the size of the components. It also enables:

the flow of electrolyte to be interrupted, if so desired, while keeping the compartment full; and the electrolyte to be caused to flow from bottom to top of the compartment, if so desired, without running the risk of emptying the compartment in the event of an accidental leakage of gas therein.

By way of example, each side of the U may be as long as the height of the electrolyte compartment, with the width of the groove lying in the range 0.5 mm to 10 mm.

The electrolyte distribution network, comprising the grooves 11, the manifolds 12 and the microchannels 13, is sealed firstly by a thin film 15 made of insulating plastic material extending at least over the said distribution network, the said film 15 being fixed to the frame 3, and secondly by the electrode 1 which overlaps the thin film 15 and which is fixed in a sealed manner thereto in the overlap region thus formed.

In the example shown, the film 15 has a similar perimeter to that of the frame 3, in particular it has orifices 47, 48A, 48B and 49 which correspond to the orifices 7, 8A, 8B and 9 respectively in the frame. The film also has a central orifice 61 corresponding to the central orifice 4 of the frame 3.

The thin film may be constituted by polypropylene, PVC, ABS, polyethylene or polystyrene, for example, and it may be 50 to 600 microns thick, with the preferred thickness being in the range 20 to 60 microns.

The thin film 15 may be fixed to the frame 3 and to the electrode 1 by any suitable means, e.g. by gluing or by welding.

The bottoms of the grooves 11 and of the electrolyte distributing and collecting manifolds 12 include means such as studs or ribs which rise to the level of the plane of the face of the frame and which serve to keep the thin film 15 off the said bottoms and to make fluid supply more regular. Thus, in the example shown, a rib 16 is provided along the entire length of each groove 11.

Further, the manifolds 12 include a plurality of ribs 17 disposed in parallel and oriented not to hinder electrolyte flow.

The tops of the ribs 16 and 17 lie in the same plane as the face 10 of the frame 3.

Using ribs instead of studs reduces the risks of perforating the thin film.

A porous embossed sheet 18 may be disposed, as shown, to act as a separator inside the electrolyte compartment.

The portion of the frame 3 delimiting the central orifice 4 is set back on both sides of the frame in such a manner that the electrodes 1 and 2 do not overlap the faces of the frame 3 after being pressed against the set-back portions of the frame, with the thin film 15 fitting into the set-back portions without damage and being fixed to the electrodes 1 in said set-back portions.

Figures 2, 3, 4:
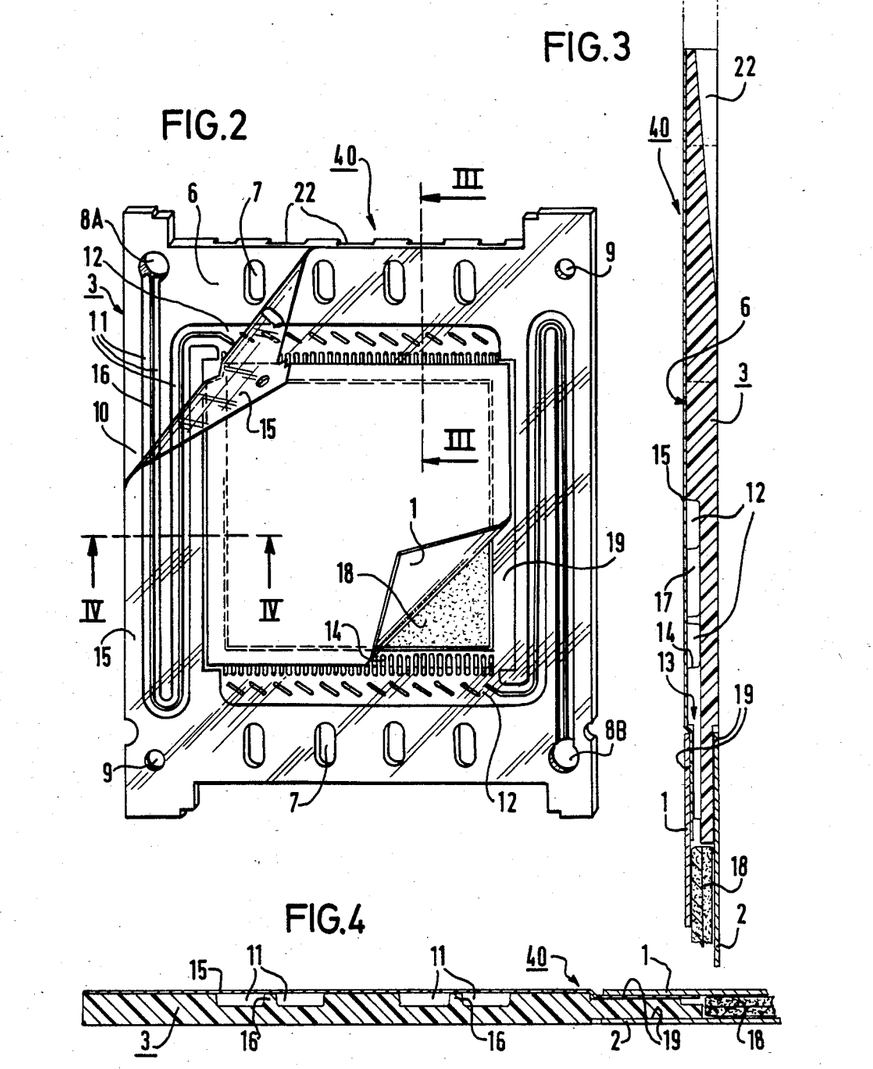
FIG. 2 is a front view of a cell constituted by assembling the various components shown in FIG. 1, with some of the components shown folded back.
FIG. 3 is a section on a larger scale on a line III—III of FIG. 2.
FIG. 4 is a section on a larger scale on a line IV—IV of FIG. 2.

This structure is particularly clearly seen in FIGS. 3, 4 and 5, in which the set-back portions of the frame 3 delimiting the orifice 4 are referenced 19. In said set-back portions, the ribs 14 which delimit the microchannels 13 include respective portions 20 which are level with said setback portions 19 and on which the electrode 1 is received, followed in the direction of the manifolds 12 by respective portions 21 which are level with the plane of the face 10 of the frame 3.

Figure 6:
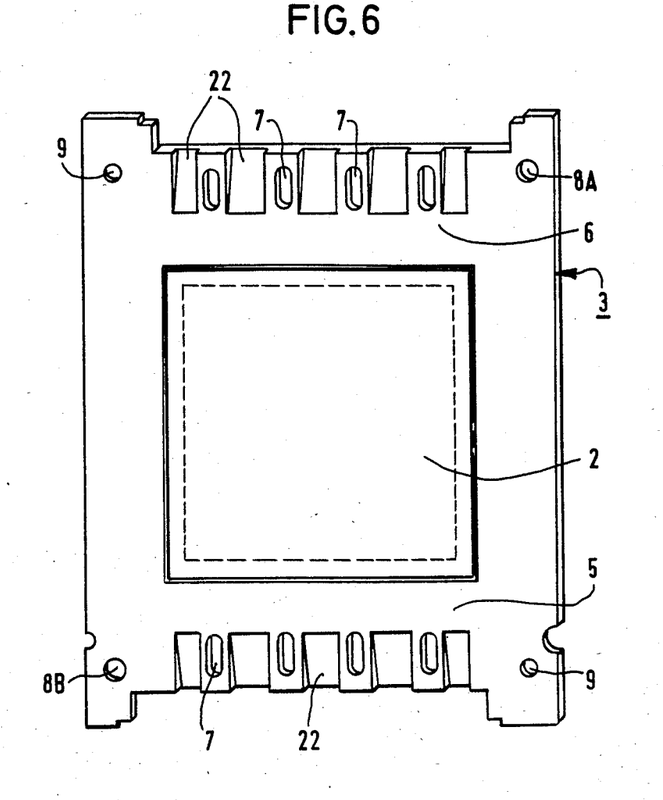
FIG. 6 is a view of the other face of the cell shown in FIG. 2.

FIG. 2 shows the face of the cell 40 which is supplied with fuel, while FIG. 6 shows the face which is supplied with oxidant. In FIG. 6 it can be seen that the bottom and top portions 5 and 6 of the frame 3 includes notches 22 located between the orifices 7. These notches are co-operate with corresponding notches or grooves in the current collectors to increase the inlet and outlet sections for oxidant through the cell. The notches 22 are also shown in FIGS. 1, 2, 3, and 5. Ribs may be disposed inside the notches 22 facing the ribs provided in the corresponding grooves of the cathode face of the collector, the association of these ribs ensuring that the section of the duct constituted by any pair of corresponding ribs is maintained.

FIGS. 7 to 11 relate to the current collectors. The current collectors are impermeable bipolar collectors including at least a central conductive zone including channels on each of the faces of the said collectors, with the bottom and top portions of the said collectors situated on either side of the said central conductive zone beng provided with orifices for the flow of electrolyte and fuel through the cell structure.

In the example shown, the current collectors are designated by reference 23. They include a central conductive zone 24 of the same shape as the electrodes 1 and 2 as shown in FIG. 1 and surrounded by a peripheral insulating zone 25. The top and bottom portions 26 and 27 of the insulating zone 25 include orifices 28, 29A, 29B and 30 which correspond respectively to the orifices 7, 8A, 8B and 9.

On each of the faces 31 and 32 of the current collectors, the central conductive zone is provided with generally vertical splines defining channels for gas flow.

Figure 9:
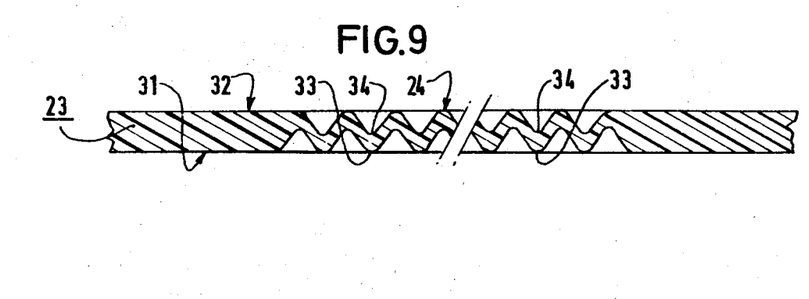
FIG. 9 is a section on a larger scale of a portion of the current collector on a line IX—IX in FIG. 7.

In the example shown, the splines 33 are vertical and define channels 34 which are likewise vertical. The network of splines and channels may be obtained by corrugating a sheet as shown in FIG. 9, but it is also possible for the sheet to have a plane central core with matching projecting splines on either side thereof. The sheet may be 50 microns to 3 mm thick, and is preferably 0.1 mm to 0.5 mm thick.

It is also possible to use zig-zag splines instead of vertical splines, or splines of any other shape. The pitch and the height of the splines (and hence the pitch and the depth of the grooves) may be in the range 0.2 mm to 5 mm and are preferably in the range 0.5 mm to 1.5 mm.

The face 31 of the collector is intended to be fed with oxidant, e.g. air or oxygen, while the face 32 is fed with fuel, e.g. hydrogen.

The top and bottom portions 26 and 27 of the cathode face 31 of each collector are provided with grooves or hollows such as 35 which communicate with the exterior and enable the said cathode face of the collector to be supplied with oxidant and also serve to evacuate the oxidant, using a substantially rectilinear path thus avoiding head losses due to changes of direction, which head losses could be particularly large if the oxidant is air due to the very high flow rates that are necessary.

The top and bottom portions of the face 32 of each collector are provided with grooves or hollows 36 for fuel flow over the anode face of the collector from the supply orifices 28 to the exhaust orifices 28. Gas flow distribution means are provided in the said grooves or hollows 35 and 36.

These means are constituted by elongate ribs which form distribution channels with the top faces of the ribs lying in the same plane as the face of the collector in which the grooves or hollows are provided thus serving to maintain a gap between the bottom of the collector on which the ribs are formed and the adjacent components of the cell structure. The channels formed in this way are generally vertical.

It follows that since the channels delimited by the splines on the conductive portions of each collector also extend generally vertically (as shown in the figure), both the fuel and the oxidant flow in the same generally vertical direction along respective faces of the collector.

Figure 11:
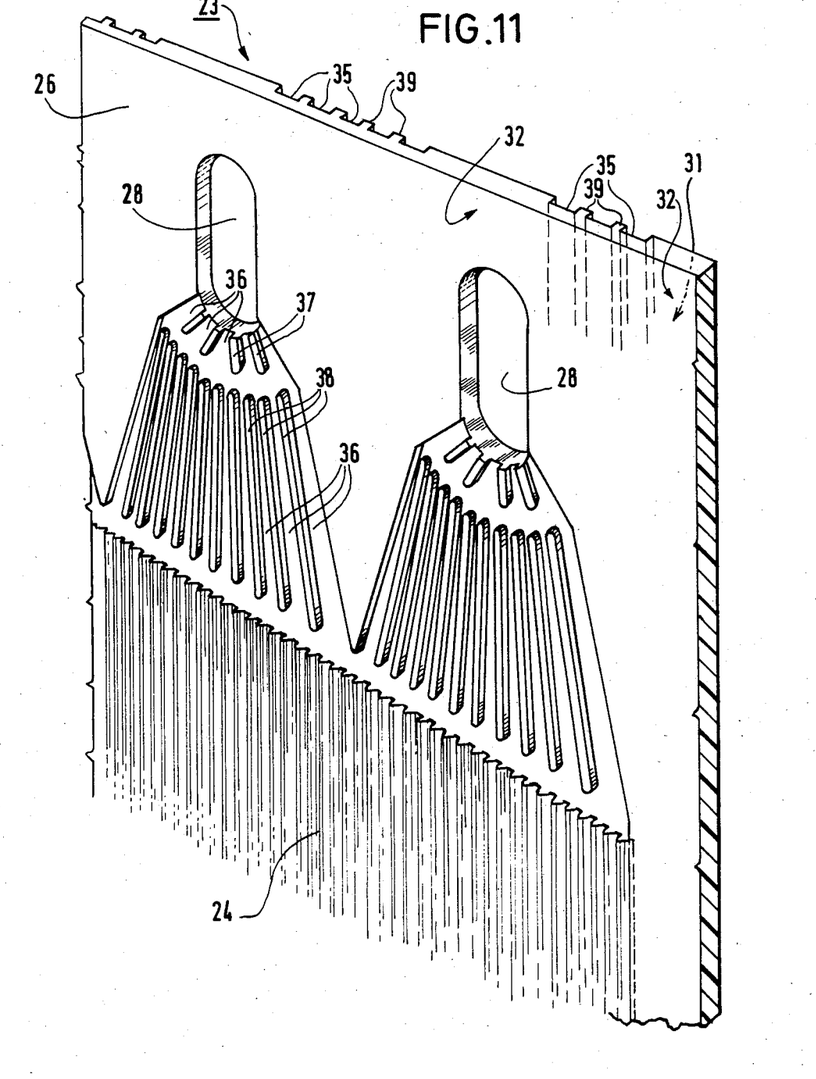
FIG. 11 is a perspective view on a larger scale of a portion or detail XI of FIG. 8.

As can be seen in FIG. 11, the fuel supply orifices 28 are oblong in shape with the grooves or hollows 36 serving to guide the fuel that flows out from those portions of the said oblong orifices which are closest to the anode face of the collector 23. The fuel distributing ribs constitute networks fanning out from the said orifices 28 towards the conductive portion 24 of the collector. Ribs 37 situated close to the orifices 28 define first channels that feed a larger number of second or intermediate channels defined by ribs 38, said second channels being of greater length than the first channels and leading to the vicinity of the channels in the conductive portion 24 of the collector, with each second channel feeding at least one channel 34 in the conductive portion 24 of the collector.

The elongation of the fuel distribution channels makes it possible to stack large numbers of cells with low gas head losses in the channels which are common to all the cells. It also improves drainage of unwanted liquids into the bottoms of the bottom oblong channels without hindering flow of the residual fuel gas.

Figure 10:
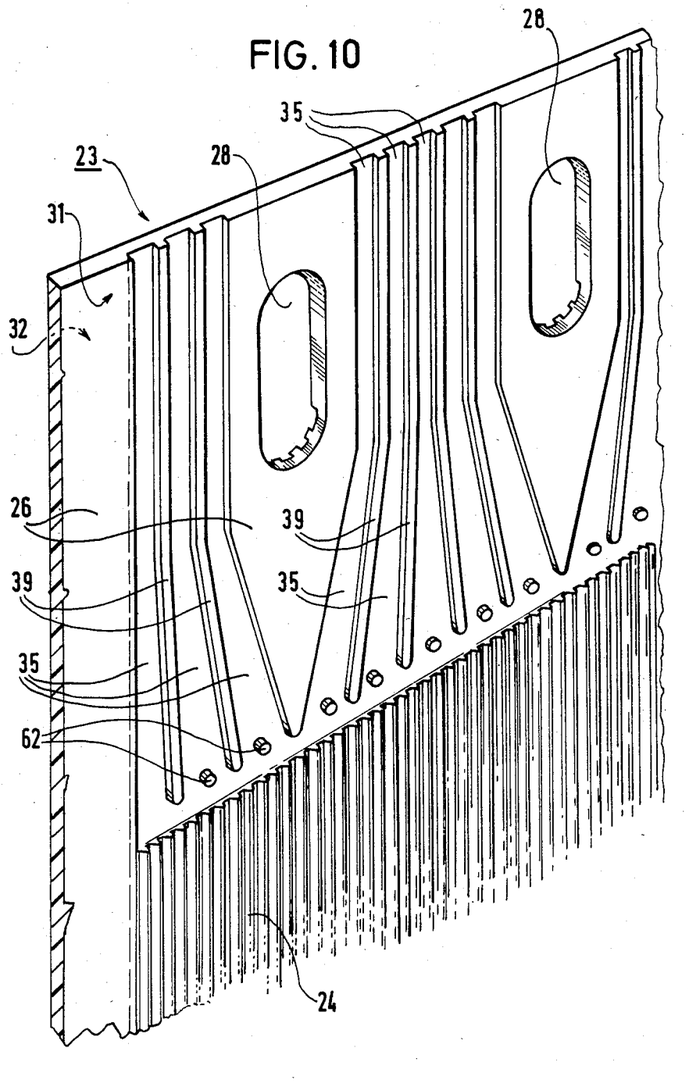
FIG. 10 is a perspective view on a larger scale of a portion or detail X of FIG. 7.

As can be seen in FIG. 10, the ribs 39 for distributing the oxidant flow are elongate and define distribution channels which are substantially vertical on the figure and which are flared towards the conductive portion of the collector. The path of the oxidant along the cathode face of the collector is substantially rectilinear without significant change of direction without obstacles. Studs 62 may be located between the flared ends of the ribs 39 adjacent to the conductive portion 24.

Since the distribution channels open out over the entire horizontal length of the conductive portion of the collector, the oxidant is uniformly distributed over the cathode face.

For similar reasons, the fuel is uniformly distributed over the anode face.

Advantageously, the ends of the ribs 38 closest to the conductive portion 24 are superposed over the ends of the ribs 39 and the studs 62 so as to improve the positioning and fixing of these zones of the current collectors during assembly and clamping of the various components constituting the structure.

The frame 3 together with the insulating portions of the current collectors are advantageously constituted of the same synthetic insulating material, thereby making these components easier to fix together.

These components may thus be made of polypropylene, polyethylene, polystryene, PVC, ABS, polysulphones, . . . .

These materials may be impregnated with various substances, e.g. talc, to modify their mechanical and thermal properties, and in particular to obtain a coefficient of thermal expansion close to that of the central conductive zones of the current collectors.

By way of example, these components could be made from talc impregnated polypropylene, with 5% to 95% talc, and preferably with 35% to 45% talc.

The central conductive portions of the current collectors may advantageously be made of the same plastic material as is used for making the frame 3, but impregnated with conductive material, e.g. powdered metal, graphite, carbon, oven black, or acetylene black, or fibers of carbon or graphite, or a mixture of such material. By way of example, it may be constituted by polypropylene impregnated with 10% to 90% carbon black, and preferably with 30% to 50% carbon black.

The frame and the collectors may be made by thermocompression or by injection molding.

Injection molding is particularly advantageous for making the current collectors since the materials constituting the central conductive portion and the peripheral insulating portion can be simultaneously injected in the liquid state into the mold, thereby ensuring that the conductive and the insulating portions are welded together without any apparent discontinuity between the two zones. This technique is also very cheap.

Figure 12:
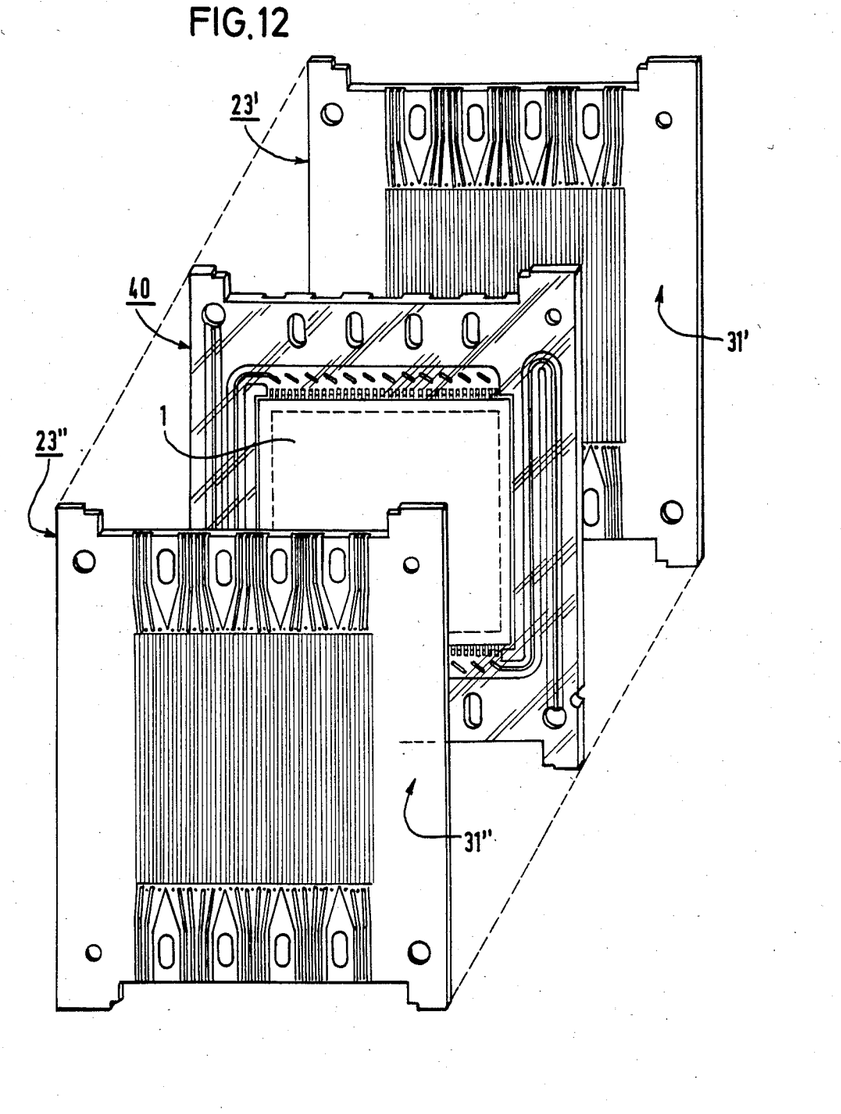
FIG. 12 is an exploded view of a cell from a cell structure in accordance with the invention.

FIG. 12 is an exploded view of a fuel cell suitable for constituting a part of a fuel cell structure in accordance with the invention.

Figure 7:
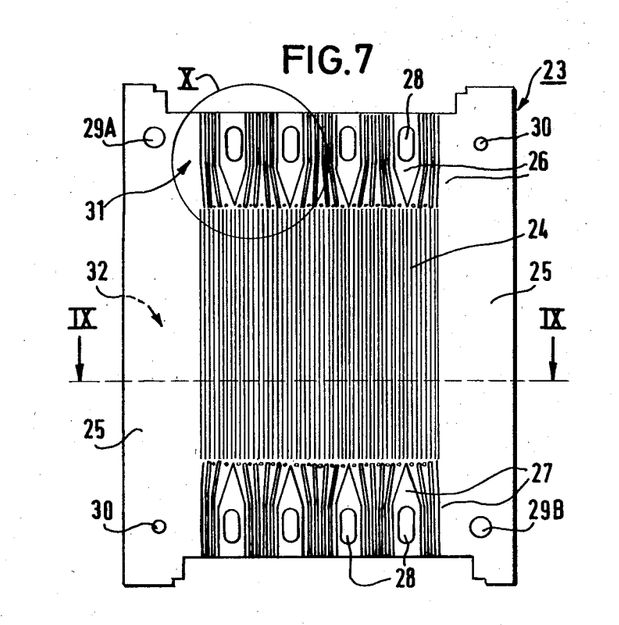
FIG. 7 is a view of one face of a bipolar current collector.
Figure 8:
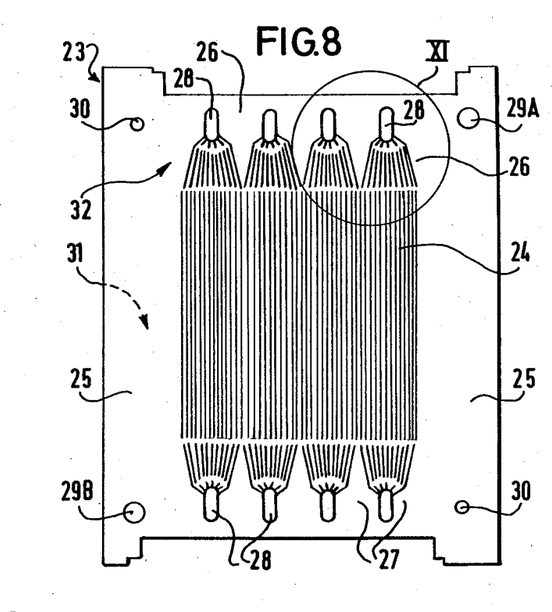
FIG. 8 is a view of the other face of the FIG. 7 current collector.

Reference 40 designates the assembled components shown in FIG. 7 and comprises the frame 3 supporting the electrodes 1 and 2, together with the plastic film 15. Two current collectors of the type described above are placed on either side of this assembly. A first collector 23' has the high points of its cathode face 31' in electrical contact against the external cathode surface (hidden) and has its cathode face in electrical contact with the external anode face of an adjacent cell (not shown). A second collector 23" has the high points of its anode face (hidden) in electrical contact against the external face of the anode 1, and has its cathode face 31" in electrical contact against the cathode of the other adjacent cell (not shown).

A gas oxidant, e.g. air, flows between the cathode of the assembly 40 and the cathode face of the collector 23' through the channels defined by the splines present on the central conductive portion of the collector 23'.

A gas fuel, e.g. hydrogen, flows between the anode 1 and the anode face of the collector 23" in the channels defined by the splines present on the central conductive portion of the collector 23".

The electrodes are electrically fixed to the current collectors along the ridges of the splines of their conductive portions by any suitable means, e.g. by compression, by welding, by gluing, . . . .

However, it may be advantageous to keep the peripheral ring unfixed relative to the electrodes so as to permit differential expansion and thus avoid breaking or cracking the electrodes during assembly and during operation.

Figure 13:
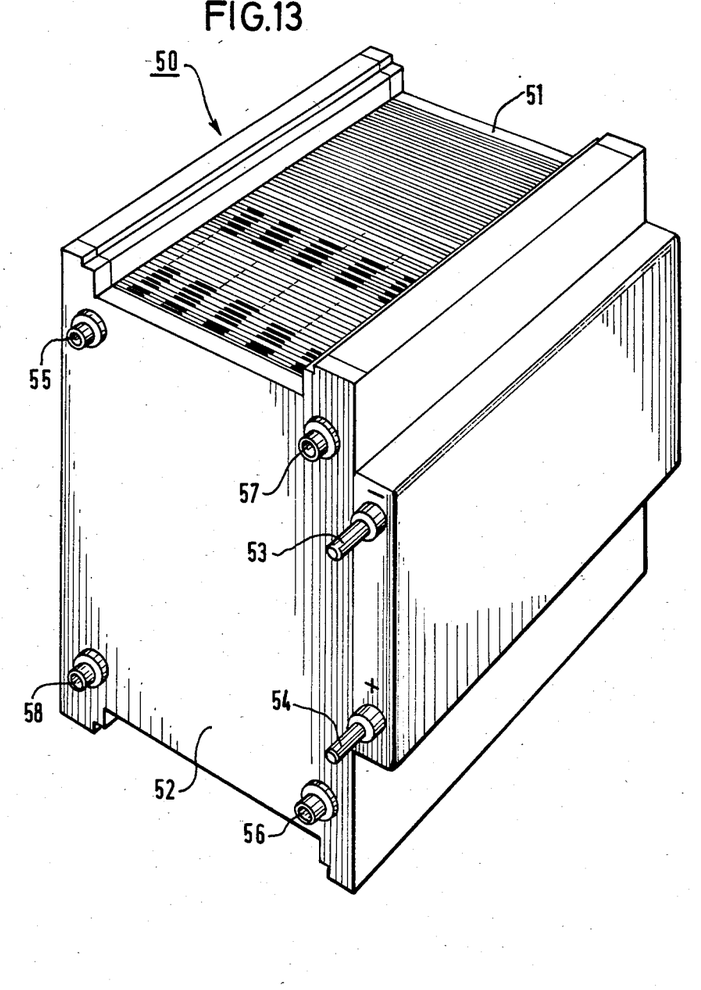
FIG. 13 is a very diagrammatic perspective view of a fuel cell structure in accordance with the invention.

FIG. 13 shows a fuel cell structure in accordance with the invention and constituted by assembling a plurality of cells of the type shown in FIG. 12.

Reference 50 desginates the structure as a whole, with the end plates being designated by references 51 and 52. References 53 and 54 designate electrical terminals connected to respective end collectors which cap the ends of the stack of cells.

In one embodiment, the end collectors may be different from the bipolar collectors described above for use within the stack. The end collectors may have respective thin metal members on their faces which constitute the outside ends of the stack, said members being of at least the same surface area as the active zones of the collectors and being preferably in the form of a sheet, a grid, an expanded sheet, or a deposit, which may be applied against said face or incorporated therein.

The metal members may extend sideways for connection to respective terminals.

Orifices for admitting electrolyte to the structure and for removing therefrom are referenced 55 and 56, and references 57 and 58 designate references for fuel gas admission and evacuation.

The oxidant enters the structure through orifices which are clearly visible in the figure. These orifices are formed by juxtaposition of the hollows 35 and 22 provided on the current collectors 23 and on the facing faces of the frames 3 to which the electrodes 2 are pressed.

We claim:

1. In a fuel cell structure constituted by a plurality of cells disposed in electrical contact with one another, each cell comprising:

first and second porous electrodes which are plane in shape with parallel faces, one being a cathode and the other an anode, and each including a specific catalyst;

an electrolyte filling the gap situated between said electrodes; and two impermeable bipolar current collectors, including at least a central conductive zone having channels on each face of said collectors, a first collector making electrical contact via the high points of its cathode face with the external surface of said cathode, and via its anode face with the external surface of the anode of an adjacent cell, and a second collector making electrical contact via the high points of its anode face with the external surface of said anode, and via its cathode face with the cathode of the other adjacent cell, said first and second electrodes being applied on either side of a frame of insulating plastic material and having a central orifice in the form of a quadrilateral, said electrodes and said frame together defining an electrolyte compartment, orifices within the top and bottom portions of said collectors situated on either side of the central conductive zone being for conveying fuel and electrolyte through the cell structure, one face of said top and bottom portions of said collectors being provided with hollows enabling both the anode face of the collector to be supplied with fuel from the fuel conveying orifices disposed in one of said portions, and the fuel to be evacuated via the fuelconveying orifices disposed in the other portion, the other face of said portions being provided with hollows communicating with the exterior enabling the cathode face of the collector to be supplied with oxidant, such that an oxidizing gas flows between said cathode and the cathode face of the first collector, and a fuel gas flows between said anode and the anode face of the second collector, and means for distributing gas flows disposed in said hollows provided in both faces of the top and bottom portions of the collector, the improvement wherein said distribution means comprise elongate ribs forming distribution channels, the top face of the ribs lying in the same plane as the face of the portion on which said ribs are provided, said collectors including parallel splines in said central conductive zones defining channels having an average vertical orientation for conveying the gas flows and which are fed from said distributing channels.

2. A fuel cell structure according to claim 1, wherein the fuel supply orifices are preferably oblong in shape with the fuel-conveying hollows in the current collectors opening out close to the portions of said oblong orifices which are situated closest to the central conductive zone of the collector, said fluid-distributing elongate ribs define a network that flares away from said orifices towards the central conductive zone of the collector including ribs situated adjacent to the oblong shaped orifices defining channels which themselves supply a greater number of intermediate channels defined by other ribs of greater length and leading to the vicinity of the channels of the collector, and wherein each intermediate channel supplies at least one channel of the central conductive zone of the collector.

3. A fuel cell structure according to claim 1, wherein elongate ribs are disposed on the faces of the bottom and top portions of the collector in contact with the oxidant supplied to the cathode face of the collector define distribution channels which fan out in their portions adjacent to the central conductive zone of the collector.

4. A fuel cell structure according to claim 3, further comprising studs provided between the fanned out ends of the ribs on the oxidant face of each collector adjacent to the conductive portion thereof, with the ends of the ribs on the fuel face of the same collector and adjacent to the conductive portion thereof being superposed on the ends of ones of the oxidant face ribs and the studs therebetween.

5. A fuel cell structure according to claim 1, wherein the porous electrodes are pressed against frames made of insulating plastic material and having respective central orifices which are quadrilateral in shape, the bottom and top portions of the frames facing the hollows provided in the bottom and top portions of the collector having the means for enabling the cathode face of the collector to be supplied with oxidant provided, in the vicinity of the exterior edge of the said frames, with corresponding notches increasing the oxidant inlet and outlet sections to the cell.

6. A fuel cell structure according to claim 5, wherein said notches are provided with ribs facing the ribs provided in the corresponding distribution channels.

* * * * *